(12) United States Patent
Uratani et al.

(10) Patent No.: US 9,389,143 B2
(45) Date of Patent: Jul. 12, 2016

(54) TEST SYSTEM

(71) Applicant: HORIBA, Ltd., Kyoto (JP)

(72) Inventors: Katsumi Uratani, Kyoto (JP); Tsutomu Misogi, Kyoto (JP); Katsuhiro Hachiuma, Kyoto (JP)

(73) Assignee: HORIBA, Ltd., Kyoto (JP)

( * ) Notice: Subject to any disclaimer, the term of this patent is extended or adjusted under 35 U.S.C. 154(b) by 556 days.

(21) Appl. No.: 13/901,284

(22) Filed: May 23, 2013

(65) Prior Publication Data

US 2013/0317775 A1 Nov. 28, 2013

(30) Foreign Application Priority Data

May 24, 2012 (JP) ................... 2012-118183
May 24, 2012 (JP) ................... 2012-118184

(51) Int. Cl.
*G01M 15/10* (2006.01)
*G01M 17/007* (2006.01)

(52) U.S. Cl.
CPC .......... *G01M 15/102* (2013.01); *G01M 17/007* (2013.01)

(58) Field of Classification Search
CPC .................................................. G01M 15/102
USPC ......................................................... 702/113
See application file for complete search history.

(56) References Cited

U.S. PATENT DOCUMENTS

2010/0305827 A1* 12/2010 Fournel ............... G01M 15/108
701/102
2013/0317688 A1* 11/2013 Uratani ................. G01M 15/10
701/29.1

FOREIGN PATENT DOCUMENTS

| JP | 08-063223 | 3/1996 |
| JP | 08-159967 | 6/1996 |
| JP | 2000-090057 | 3/2000 |
| JP | 2000-111506 | 4/2000 |
| JP | 2002-071527 | 3/2002 |
| JP | 2003-279583 | 10/2003 |
| JP | 2003-344422 | 12/2003 |
| JP | 2004-318762 | 11/2004 |

(Continued)

OTHER PUBLICATIONS

Hiroshi Kawamura, Automotive Development and Progress in HORIBA's Emission Measurement Technologies, Readout, Jan. 31, 2009, No. 34, pp. 44-49.

*Primary Examiner* — Bryan Bui
(74) *Attorney, Agent, or Firm* — Brooks Kushman P.C.

(57) ABSTRACT

One or more testing devices used for a test, a device management apparatus that is communicably connected to the testing devices to manage the testing devices, and an automatic test management apparatus that sets a schedule of the test, and on the basis of the schedule, issues a command to the device management apparatus are provided. The device management apparatus is provided with a disconnecting/connecting operation sensing part that senses that a disconnecting/connecting operation for connecting or disconnecting any of the testing devices has been performed; and a management main body part that, in the case where the disconnecting/connecting operation sensing part detects a connecting operation, starts a predetermined connecting protocol for establishing a connecting state and starts management of the testing device, as well as in the case where the disconnecting/connecting operation sensing part detects a disconnecting operation, canceling the connection to terminate the management of the testing device.

10 Claims, 11 Drawing Sheets

(56) References Cited

FOREIGN PATENT DOCUMENTS

| JP | 2005049353 | 2/2005 |
| JP | 2006-106974 | 4/2006 |
| JP | 2006-330879 | 12/2006 |
| JP | 2012-038044 | 2/2012 |

\* cited by examiner

TEST SYSTEM

CROSS-REFERENCE TO RELATED APPLICATIONS

This application claims priority to JP Application No. 2012-118183, filed on May 24, 2012, and JP Application No. 2012-118184, filed on May 24, 2012, the disclosures of which are incorporated in their entirety by reference herein.

TECHNICAL FIELD

The present invention relates to a test system for testing, in addition to a moving body itself such as a vehicle, ship, or airplane, a component used for the moving body, such as an internal combustion engine.

BACKGROUND ART

Conventionally, as a vehicle test system, for example, there is known a test system that is adapted to connect a plurality of measuring devices to one measurement management apparatus, and make the measurement management apparatus collectively manage the measuring devices. Further, as disclosed in JPA 2005-49353, there is also a system that is adapted to provide an automatic test management apparatus above the management apparatus, and make the automatic test management apparatus determine a test schedule.

SUMMARY

Technical Problem

However, freely and simply determining timing to make the management apparatus manage the measuring devices, i.e., determining a management start point and a management end point, on the management apparatus side is not taken into account at all.

Therefore, a request to almost simultaneously start to manage the measuring devices, or a request to suspend the management of some of the measuring devices at a desired time point, and operate another measuring device to smoothly shift to the management of it cannot be met.

Such a problem is common to testing devices including the measuring devices.

The present invention is made in consideration of such a problem, and a main intended object thereof is to enable connecting states of one or more measuring devices to be freely controlled only by operations on the management apparatus side to thereby more flexibly and more easily perform a test.

Also, each of the measuring devices should be regularly inspected, calibrated, and maintained because the use thereof causes a reduction in performance to make it impossible to ensure reliability of measuring accuracy. Times of such an inspection and the like may be provided for in test regulations.

However, aside from a rigid system in which a measuring device is constantly connected with the same device management apparatus, in the case of configuring a flexible system that enables a measuring device to be moved to another test room, and connected to another device management apparatus, device state information such as past inspection and calibration histories of the measuring device cannot be inherited when the measuring device is connected to the another management device, but is reset, and an appropriate inspection time, an appropriate maintenance time, and the like may be missed.

Such a problem is, without limitation to the measuring device, common to various testing devices.

The present invention is made in consideration of such a problem, and a main intended object thereof is to provide a test system that is adapted to be able to, no matter which device management apparatus any testing device is connected to, appropriately and surely manage inspection, maintenance, and the like of each testing device by a corresponding device management apparatus, and can be more flexibly operated.

Solution to Problem

That is, a test system according to the present invention is one that is, with a moving body such as a vehicle, a ship, or an airplane, or a device used for the moving body being set as an object, intended to perform a test of the object, and the test system is provided with: one or more testing devices used for the test; a device management apparatus that is communicably connected to the testing devices to manage the testing devices; and an automatic test management apparatus that, for example, sets a schedule of the test, and on the basis of the schedule, performs operation such as issuing a command to the device management apparatus, wherein the device management apparatus is provided with: a disconnecting/connecting operation sensing part that senses that a disconnecting/connecting operation for connecting or disconnecting any of the testing devices has been performed; and a management main body part that, in the case where the disconnecting/connecting operation sensing part detects a connecting operation, starts a predetermined connecting protocol for establishing a connecting state and starts management of the testing device, as well as in the case where the disconnecting/connecting operation sensing part detects a disconnecting operation, canceling the connection to terminate the management of the testing device.

Note that the "connecting operation" includes not only a connecting operation with a mouse or a key board on a console but also, for example, an operation for connecting a communication cable to a connector.

If so, connecting states of one or more measuring devices can be freely controlled by the disconnecting/connecting operation performed by an operator on the management apparatus side. Accordingly, the test can be more flexibly and more easily performed.

In order to make the disconnecting/connecting operation intuitively understandable and convenient for the operator, preferably, the device management apparatus is further provided with a display part that displays a device mark indicating a preliminarily registered testing device, and a disconnecting/connecting operation button provided so as to correspond to the device mark; and the disconnecting/connecting operation sensing part detects an operation on the disconnecting/connecting operation button.

As specific embodiments include one in which the testing devices are desirably measuring devices that measure state quantities of the object, and more specifically, the measuring devices are ones used to measure exhaust gas of an internal combustion engine.

Also, a test system according to the present invention is one that is, with a moving body such as a vehicle, a ship, or an airplane, or a device used for the moving body being set as an object, intended to perform a test of the object, and the test system is provided with: one or more testing devices used for the test; and a device management apparatus that is communicably connected to the testing devices to manage the testing devices, wherein the device management apparatus is provided with: an operation sensing part that senses that a disconnecting/connecting operation for connecting or disconnecting any of the testing devices has been performed; and a device state information obtaining part that, with detection of a connecting operation in the operation sensing part as a start, obtains device state information indicating a present or past state of a corresponding testing device.

If so, no matter which device management apparatus any testing device is connected to, present or past device state information (such as past inspection date/time and items, or present performance state) on the connected testing device is recognized by the device management apparatus at the time, and therefore management such as automatically notifying an operator of a coming inspection date/time, maintenance data/time, inspection and maintenance items, and the like of each connected measuring device can be made in the device management apparatus. Also, as a result, a measuring device and a device management apparatus can be easily connected without selecting connecting destinations, and therefore the test system can be more flexibly operated such as being able to easily replace a testing device.

More specific examples of a system architecture that can more easily realize the present invention can include one that the device state information is accumulated in a local accumulation part provided in the testing device, and the device state information obtaining part accesses the local accumulation part to obtain the device state information on the testing device.

In addition, for example, an embodiment in which a storage device that stores piece of device state information on respective connectable testing devices in common is provided, and when any of the testing devices is subjected to the connecting operation, the device management apparatus accesses the storage device to obtain device state information on the testing device is also possible. Note that, in this case, it is necessary to consider a handling way in case such as network construction, or use of any of the testing devices outside a network.

In order to enable an operator to recognize a time-dependent change in state of a testing device, or a tendency of the change to more accurately handle the testing device, preferably, the test system is further provided with a management main body part that recognizably displays a chronological change in the device state information on a screen, as well as in the case where a value of the device state information exceeds a predetermined threshold value, notifying of this.

As specific device state information, in the case where the testing device is a pump, pump pressure information that is information indicating suction pressure by the pump, or in the case where the testing device is a measuring device, function information that is information on a function of the measuring device, accumulated operating time information indicating an accumulated operating time of the testing device, or inspection date/time specifying information that is information for specifying a preset inspection date/time of the testing device can be cited.

Specific embodiments include one in which the testing devices are desirably measuring devices that measure state quantities of the object, and more specifically, the measuring devices are devices that are provided in an exhaust path of an internal combustion engine and measure exhaust gas flowing through the exhaust path.

Advantageous Effects of Invention

According to the present invention configured as described, the connecting states of the one or more measuring devices can be freely controlled by the disconnecting/connecting operation performed by the operator on the management apparatus side. Accordingly, the test can be more flexibly and more easily performed.

Also, according to the present invention configured as described, no matter which device management apparatus any testing device is connected to, present or past device state information (such as past inspection date/time and items, or present performance state) on the connected testing device is recognized by the device management apparatus at the time, and therefore management such as automatically notifying an operator of a coming inspection date/time, maintenance data/time, inspection and maintenance items, and the like of each connected measuring device can be made in the device management apparatus. Also, as a result, a measuring device and a device management apparatus can be easily connected without selecting connecting destinations, and therefore the test system can be more flexibly operated.

DESCRIPTION OF EMBODIMENTS

Figure 1:
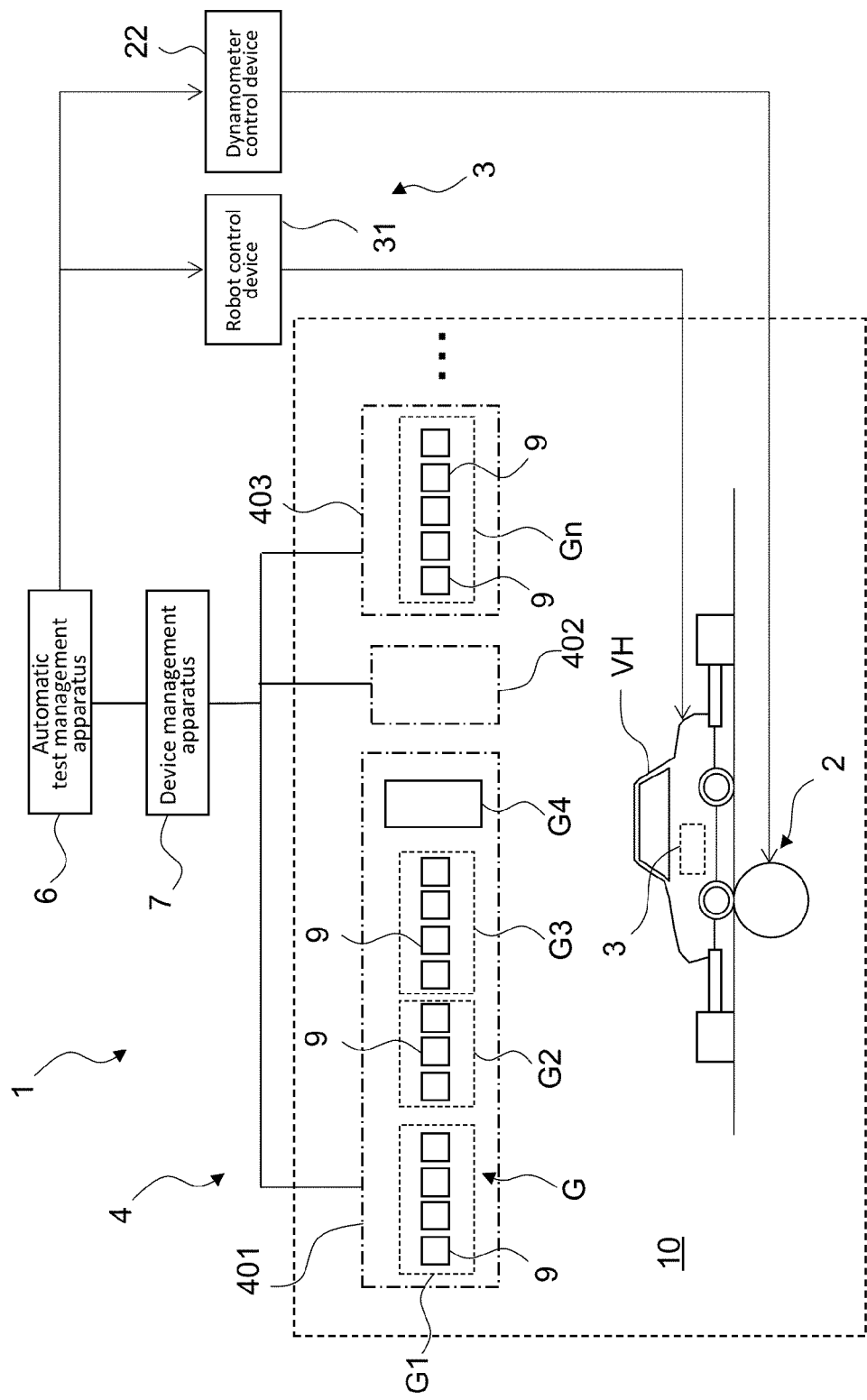
FIG. 1 is a schematic configuration diagram of a vehicle performance test system according to a first embodiment of the present invention.
Figure 2:
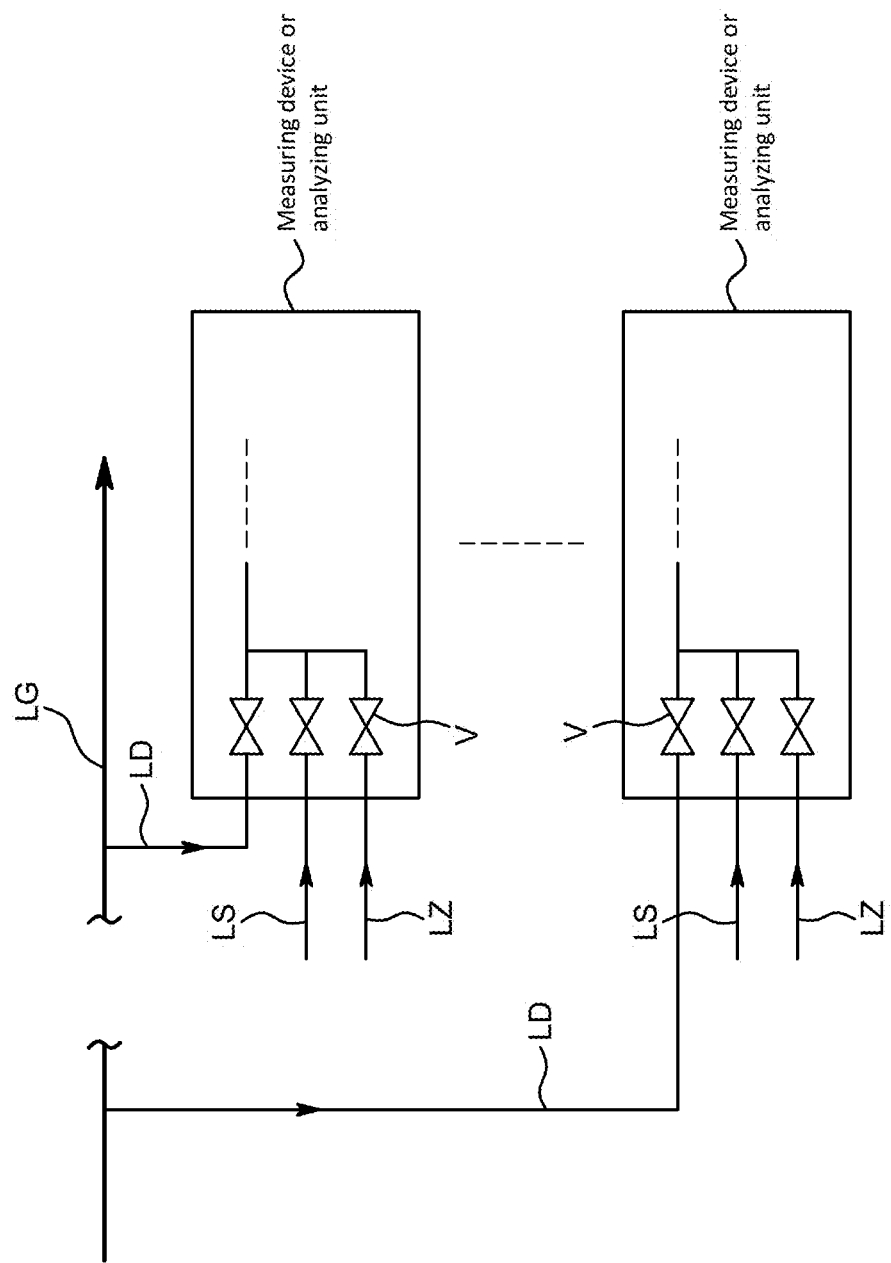
FIG. 2 is a fluid circuit diagram simply illustrating gas flow paths in the first embodiment.

In the following, a first embodiment of the present invention is described referring to the drawings.

FIG. 1 is a diagram schematically illustrating the whole of a vehicle performance test system 1 according to the present embodiment. The vehicle performance test system 1 is one that is, as illustrated in the diagram, provided with a chassis dynamometer 2, an automatic driving apparatus 3, an automatic test management apparatus 6, a plurality of testing devices (exhaust gas measuring devices) 4, a device management apparatus 7, and the like, and can bring a vehicle VH into a pseudo-running state on the chassis dynamometer 2, and measure a fuel consumption, exhaust gas components, and the like of the vehicle VH to test vehicle performance. In addition, the vehicle performance test system 1 can also test an engine as a single body.

The respective parts are described.

The chassis dynamometer 2 is one that is provided with: a rotating drum; a motor or a flywheel (not illustrated) that applies a load to the rotating drum; and a dynamometer control device 22 that controls them. The rotating drum and the motor or flywheel are placed in a test room 10, and the chassis dynamometer 2 is configured such that by setting up driving wheels of the vehicle VH in a test location located directly on a top part of the rotating drum, the vehicle VH can run in a state similar to that at the time of an actual run. The dynamometer control device 22 is contained in, for example, a measurement room that is provided adjacent to the test room 10. In addition, the test room 10 and the measurement room (or in addition to them, a pit) are collectively referred to as a so-called cell or lab.

The automatic driving apparatus 3 is one that is provided with: a driving robot (not illustrated) that is mounted in a driver's cab of the vehicle VH and drives an accelerator, brakes, clutch, and the like; and a robot control device 31 that is connected to the driving robot to control the driving robot, and adapted to be able to, by providing various command signals to the robot control device 31, control the driving robot to perform a performance test of the vehicle VH or the engine according to, for example, any of various standardized regulations (such as CFR and TRIAS). The robot control device 31 is contained in, for example, the measurement room.

The automatic test management apparatus 6 is one that, although detailed description thereof is omitted, has a basic function of setting a running test schedule. Setting the running test schedule includes, for example, setting a regulation and a test date, and in addition, may include more minutely setting behavior of the vehicle VH, such as a vehicle speed and an engine rotational speed, and setting a measurement object, measurement timing, and the like. The automatic test management apparatus 6 is provided with a communication port, and mutually communicably connected with the measuring devices 4, chassis dynamometer 2, automatic driving apparatus 3, and the like by wire or wireless means.

When such schedule settings are made by an operator, the automatic test management apparatus 6 transmits a command according to a set schedule to the chassis dynamometer 2, automatic driving apparatus 3, device management apparatus 7, and the like to control them such that a test according to the schedule is automatically performed.

Note that in FIG. 1, the one automatic test management apparatus 6 is connected with the one device management apparatus 7; however, the one automatic test management apparatus 6 may be connected with a plurality of device management apparatuses 7. The automatic test management apparatus 6 can perform scheduling independently for each of the device management apparatuses 7.

As the exhaust gas measuring devices 4 (hereinafter also simply referred to as measuring devices 4), in the present embodiment, for example, one that measures HC, $NO_x$, CO, $CO_2$, and the like in exhaust gas flowing through an exhaust path of the internal combustion engine, and one that performs preprocessing for measuring the exhaust gas components, such as CVS are prepared. Each of the measuring devices 4 is configured to integrate one or more units as unit devices, such as a gas analyzing unit 9 and another operation unit; however, the units are not always physically integrated. For example, referring to the whole of a plurality of separated configurations, it is called one measuring device, and a plurality of measuring devices may be provided in one housing. In addition, the gas analyzing unit 9 refers to, for example, FID for measuring THC, CLD for measuring $NO_x$, NDIR for measuring CO and $CO_2$, or the like.

The measuring devices 4 are also set as management units in an after-mentioned storage part 75 of the device management apparatus 7 or in a database shared thereby. To describe data structure inside the storage part 75 in detail, the storage part 75 stores hierarchical structure data having tree structure in which as a lower layer of a device hierarchy to which the measuring devices 4 belong to, a group hierarchy to which groups belong to is formed, and further, under the group hierarchy, a unit hierarchy to which analyzing units and the like belong to is formed.

Each of the groups is provided for as, for example, a set of one or more gas analyzing units 9 that operate for a common purpose. The common purpose refers to, for example, exhaust gas component analysis at a predetermined sampling point in an intake and exhaust path LG, or measurement of predetermined performance (such as an EGR rate or an exhaust gas flow rate) of the internal combustion engine EG.

Note that the present embodiment is configured to be able to perform a change operation on the storage part 75, such as upgrading a group to a measuring device, or changing an analyzing unit belonging to a group, and subject to the condition that each of the groups and devices is physically configured to be able to independently operate by itself (such as being provided with a pump to be able to independently sample gas).

Exemplifications of the plurality of types of measuring devices 4 in the present embodiment include, for example, a first measuring device 401 provided with: measuring groups G1 to G3 each configured to have a plurality of gas analyzing units 9 respectively having different measurement principles; and an EGR rate measuring device G4, a second measuring device 402 configured to have a fixed capacity sampling device, a third measuring device 403 configured to have a measuring group Gn including an EGR rate measuring device, and other devices.

Each of the measuring devices 4 has a local computer, and is provided with: a device main body part 4*a* that controls operating modes (such as a measurement mode, calibration mode, and purge mode) and state modes (such as a sleep mode and a stand-by mode) of the measuring device 4; and a communication part 4*b* that receives a command signal from the device management apparatus 7 as well as transmitting operating situation information to the device management apparatus 7.

The measuring devices 4 measure amounts of the respective components associated with sampled gas, such as HC, $NO_x$, CO, and $CO_2$, and from corresponding measured values, can also calculate performance values such as the fuel consumption and an EGR rate of devices constituting the vehicle VH, such as the engine and a catalyst.

Figure 3:
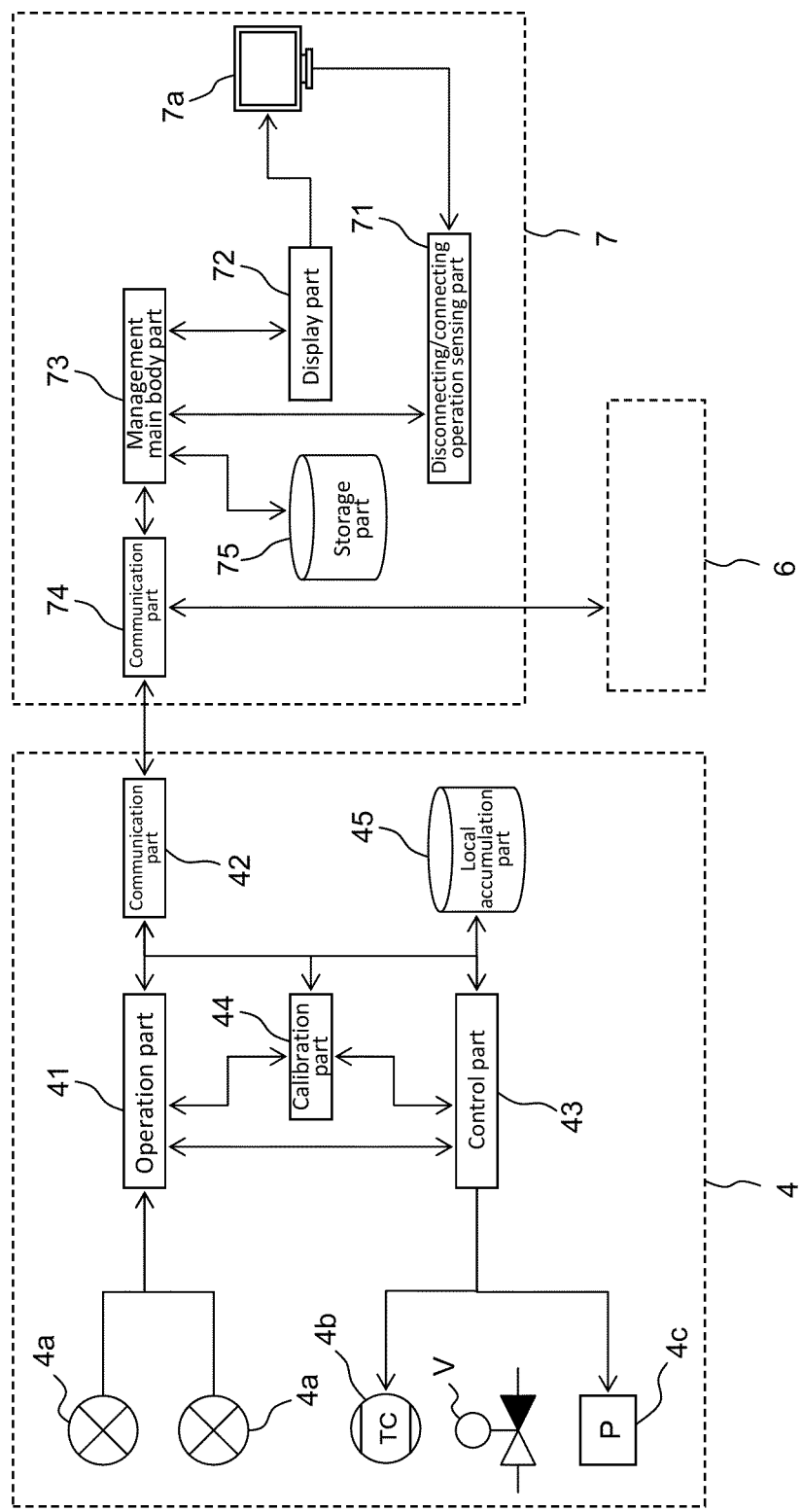
FIG. 3 is a functional block diagram of a measuring device and a device management apparatus in the first embodiment.

For this purpose, as illustrated in FIG. 3, each of the measuring devices 4 has the local computer.

The local computer is one that is physically provided with a CPU, a memory, an A/D converter, a communication interface, and the like, and fulfills function as: an operation part 41 that performs correction or calibration on output values from sensors 4*a*, which detect the predetermined components of the exhaust gas, to calculate measured values indicating the respective component amounts as well as from the measured values, calculating the device performance values; and a communication part 42 that transmits the measured values, device performance values, and the like calculated by the operation part 41 to the device management apparatus 7 according to a predetermined protocol.

Also, the local computer is further provided with: a control part 43 that receives a command signal from the device management apparatus 7 to control a valve V, temperature control mechanism 4*b*, pump 4*c*, or the like, and controls the operating modes (such as a measurement mode, calibration mode, and purge mode) and the state modes (such as a sleep mode and a stand-by mode) of a corresponding one of the exhaust gas measuring devices 4; a calibration part 44 that calibrates the sensors 4a; a local accumulation part 45 that successively obtains and accumulates pieces of device state information of the measuring device 4 over a range from the past to the present and is provided in a predetermined area of the memory; and the like.

The device state information includes, for example, pump pressure information indicating suction pressure by the built-in pump 4c, sensitivity information that is information on sensitivity of each of the sensors 4a, accumulated operating time information indicating an accumulated operating time of each part, and inspection data/time specifying information that is information for specifying a preset inspection date/time of the measuring device 4. The device state information also includes information obtained from results of calibration (zero point correction, span correction, conversion expression correction), quality check (function check of each part of each analyzing unit, pipe leak check, pump performance check, and the like), and the like performed on the measuring device 4.

The device management apparatus 7 is one that is configured by, for example, installing a predetermined program in a general-purpose computer, and physically provided with a CPU, memory, display, input means (such as a keyboard and a mouse), communication interface, and the like. Also, the CPU and its peripheral devices cooperate according a program stored in the memory, and thereby the device management apparatus 7 fulfills functions as, as illustrated in FIG. 3, a disconnecting/connecting operation sensing part 71, display part 72, management main body part 73, communication part 74, and the like. The device management apparatus 7 is provided with a communication port, and the measuring devices 4 are mutually communicably connected to the device management apparatus 7 by wire or wireless means.

Next, operation of the device management apparatus 7 is described, which doubles as description of the respective parts of the device management apparatus 7.

First, an operator performs various types of work (such as piping) associated with the measuring devices 4, and then physically connects the measuring devices 4 to the device management apparatus 7 through connector cables.

Figure 4:
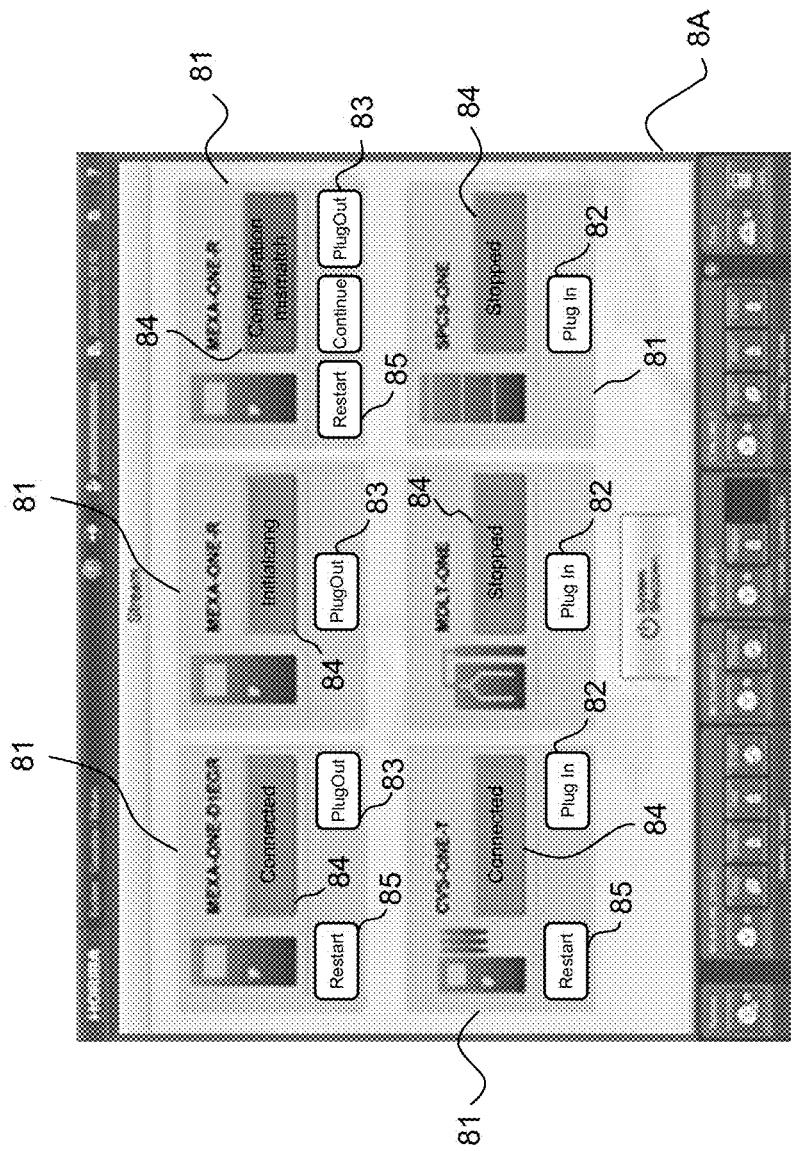
FIG. 4 is a screen configuration diagram illustrating a plug-in screen in the first embodiment.

On the display 7a of the device management apparatus 7, as an initial screen, a screen (hereinafter also referred to as a plug-in screen) 8A as illustrated in FIG. 4 is displayed by a function of the display part 72. On the plug-in screen 8A, a plurality of device marks 81 indicating preliminarily registered measuring devices 4 are arranged without overlapping one another. Each of the device marks 81 is formed in a rectangular shape, and provided with, in addition to a schematic diagram representing a corresponding one of the measuring devices 4, a connecting button 82 for connecting to the measuring device 4, a disconnecting button 83 for disconnecting the measuring device 4; and a connection state display area 84 indicating a connecting state.

When on the plug-in screen 8A, the operator clicks, for example, a connecting button 82, the disconnecting/connecting operation sensing part 71 detects the click operation as a connecting operation. Then, the communication part 74 starts to communicate with a communication part 42 of a corresponding one of the measuring devices 4, and when a predetermined connecting protocol normally terminates to establish a mutually communicable connecting state (hereinafter also simply referred to as a connecting state), a display "Connected" indicating a state of being communicably connected is displayed in the connecting state display area 84 in the device mark. In addition, until the mutual communication is established, a display "Initialization" indicating a state of being in preparation for connection is displayed in the connecting state display area 84.

On the other hand, when the disconnecting button 83 is clicked in this connecting state, the disconnecting/connecting operation sensing part 71 detects the click operation as a disconnecting operation. Then, the communication part 74 blocks the communication with the communication part 42 of the measuring device 4, and a display "Stopped" indicating a state where the connection is cancelled is displayed in the connecting state display area 84.

In addition, if the connecting button 82 is clicked in a state where a connector cable is unplugged, or the connector cable is unplugged during the connecting state, the disconnecting/connecting operation sensing part 71 senses this, and a display "Configuration Mismatch" indicating a state of failing in connection is displayed in the connecting state display area 84.

Also, in the connecting state, a reconnecting button (restart button) 85 is newly displayed, and when the reconnecting button 85 is clicked, the communication part 74 restarts the connecting protocol to make reconnection.

Meanwhile, in the present embodiment, in the connecting protocol, a step of taking pieces of device state information on the respective measuring devices 4 into the device management apparatus 7 is automatically performed.

To describe in detail, when any of the connecting buttons 82 or reconnecting buttons 85 is clicked, the disconnecting/connecting operation sensing part 71 detects the click operation, on the basis of which the management main body part 73 accesses a local accumulation part 45 of a corresponding one of the measuring devices 4 through the communication parts 42 and 74 to automatically obtain pieces of device state information on the measuring device 4 over a range from the past to the present, which are accumulated in the local accumulation part 45.

Also, after the connection, too, the management main body part 73 successively accesses the local accumulation part 45 of the measuring device 4 to additionally obtain device state information. In addition, the management main body part 73 also performs other management operations such as issuing a command for an operation mode or the like to the measuring device 4, and obtaining measured values and function performance values from the measuring device 4.

The pieces of device state information can be displayed on a screen in chronological order.

Figure 5:
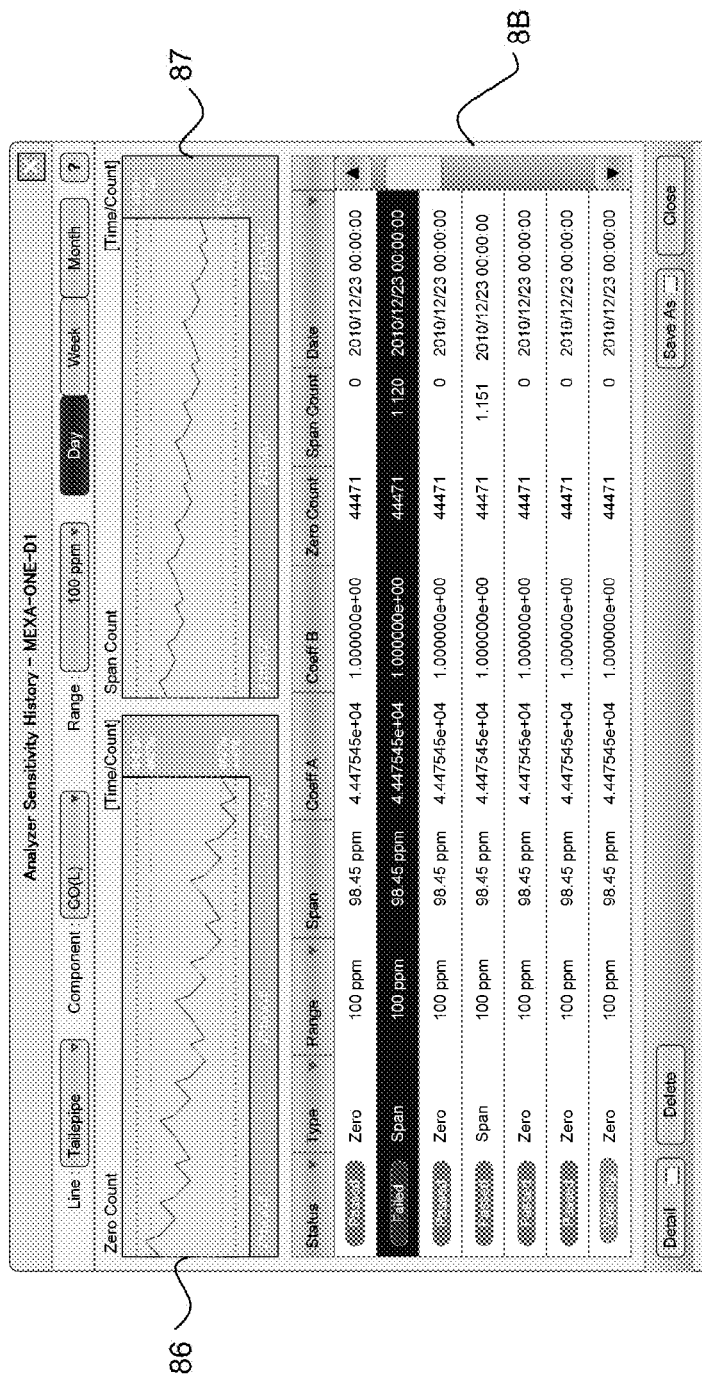
FIG. 5 is a screen configuration diagram illustrating an operating situation of a device state history screen in the first embodiment.

FIG. 5 illustrates an example of the display screen (hereinafter also referred to as a device state history screen). On the screen, changes in sensitivity and drift of a gas analyzing unit selected by the operator are displayed as graphs 86 and 87 with horizontal axes representing time. The sensitivity of the analyzing unit refers to a primary output value of a corresponding sensor 4a at the time of sensing span gas having a predetermined concentration, and a decrease in this value indicates a reduction in sensor sensitivity. The drift refers to a primary output value of a corresponding sensor 4a at the time of sensing zero gas (gas having a concentration of zero), and an increase in this value indicates an increase in offset of the sensor 4a. Amounts of the sensitivity and drift are measured at the time of calibrating a corresponding measuring device 4, and therefore every time the measurement is performed, additionally recorded in the local accumulation part 4 of the measuring device 4.

Also, in the case where the device state information exceeds (or falls below) a predetermined threshold value, the management main body part 73 of the device management apparatus 7 issues an alarm indicating the need for maintenance or replacement. As the threshold value, for the drift or sensitivity amount, a first threshold value for issuing a final alarm, and a second threshold value for issuing an alarm indicating being in a stage prior to the final alarm are provided. According to each of the alarms, the operator can readjust a corresponding analyzing unit.

According to the first embodiment configured as described above, the connecting states of the plurality of measuring devices 4 can be freely controlled by the disconnecting/connecting operation performed by the operator on the device management apparatus 7 side. Accordingly, a test can be more flexibly and more easily performed.

Also, each connectable measuring device 4 can be preliminarily registered in a plurality of device management apparatuses 7 in common in a standardized form, i.e., as the device mark 81, and therefore only by physically connecting some measuring device 4 to another device management apparatus 7 in another cell and performing the connecting operation in the same manner, the device management apparatus 7 can be made to easily recognize the measuring device 4.

In addition, at the time, the measuring device 4 accumulates pieces of device state information on the measuring device 4 itself, and at the time of the connection, the pieces of device state information are automatically taken in by the device management apparatus 7, so that even in the case of replacing a device management apparatus 7, the pieces of device state information can be inherited without leaking, and therefore compliance of regulations, and maintenance of the measuring device 4 can be surely performed.

In particular, in the first embodiment, in a state where, in device state information, for example, changes in sensitivity and drift of an analyzing unit are displayed on the screen in chronological order, if a value of the sensitivity or drift exceeds any of the threshold values, a corresponding alarm is issued. That is, the alarm is issued to the operator such that the operator can determine a tendency of the change in sensitivity or drift of the analyzing unit, and therefore as compared with the case of simply issuing the alarm without displaying the tendency, the operator can accurately determine a cause of the alarm. For example, in the case of an alarm that is outputted when the value deviates from the tendency and suddenly rises or falls, the operator can determine that the alarm is caused by a measurement error, a calibration error, or the like, and therefore the number of times of unnecessary maintenance can be reduced.

Next, a second embodiment of the present invention is described referring to the drawings.

Figure 6:
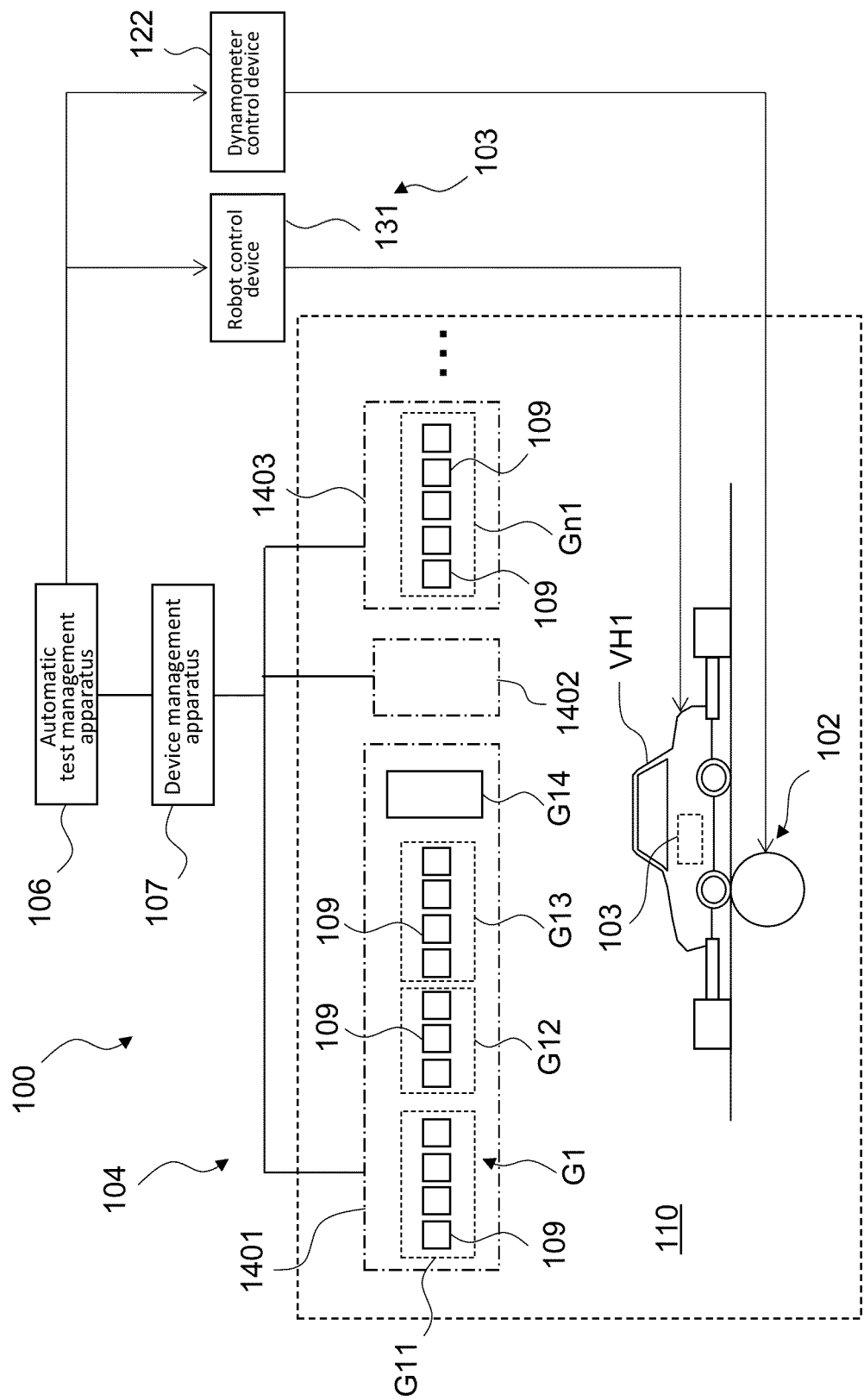
FIG. 6 is a schematic configuration diagram of a vehicle performance test system according to a second embodiment of the present invention.

FIG. 6 is a diagram schematically illustrating the whole of a vehicle performance test system 100 according to the second embodiment. The vehicle performance test system 100 is one that is, as illustrated in the diagram, provided with a chassis dynamometer 102, an automatic driving apparatus 103, an automatic test management apparatus 106, a plurality of testing devices (exhaust gas measuring devices) 104, a device management apparatus 107, and the like, and can bring a vehicle VH1 into a pseudo running state on the chassis dynamometer 102, and measure a fuel consumption, exhaust gas components, and the like of the vehicle VH1 to test vehicle performance. In addition, the test system 100 can also be used to test an engine as a single body.

The respective parts are described.

The chassis dynamometer 102 is one that is provided with: a rotating drum; a motor or a flywheel (not illustrated) that applies a load to the rotating drum; and a dynamometer control device 122 that controls them. The rotating drum and the motor or flywheel are placed in a test room 110, and the chassis dynamometer 102 is configured such that by setting up driving wheels of the vehicle VH1 in a test location located directly on a top part of the rotating drum, the vehicle VH1 can run in a state similar to that at the time of an actual run. The dynamometer control device 122 is contained in, for example, a measurement room that is provided adjacent to the test room 110. In addition, the test room 110 and the measurement room (or in addition to them, a pit) are collectively referred to as a so-called cell or lab.

The automatic driving apparatus 103 is one that is provided with: a driving robot (not illustrated) that is mounted in a driver's cab of the vehicle VH1 and drives an accelerator, brakes, clutch, and the like; and a robot control device 103 that is connected to the driving robot to control the driving robot, and adapted to be able to, by providing various command signals to the robot control device 131, control the driving robot to perform a performance test of the vehicle VH1 or the engine according to, for example, any of various standardized regulations (such as CFR1065 and 10-mode). The robot control device 103 is contained in, for example, the measurement room.

The automatic test management apparatus 106 is one that, although detailed description thereof is omitted, has a basic function of setting a running test schedule. Setting the running test schedule includes, for example, setting a regulation and a test date, and in addition, may include more minutely setting behavior of the vehicle VH1, such as a vehicle speed and an engine rotational speed, and setting a measurement object, measurement timing, and the like. The automatic test management apparatus 106 is provided with a communication port, and mutually communicably connected with the measuring devices 104, chassis dynamometer 102, automatic driving apparatus 103, and the like by wire or wireless means.

When such schedule settings are made by an operator, the automatic test management apparatus 106 transmits a command according to a set schedule to the chassis dynamometer 102, automatic driving apparatus 103, device management apparatus 107, and the like to control them such that a test according to the schedule is automatically performed.

Note that in FIG. 6, the one automatic test management apparatus 106 is connected with the one device management apparatus 107; however, the one automatic test management apparatus 106 may be connected with a plurality of device management apparatuses 107. The automatic test management apparatus 106 can perform scheduling independently for each of the device management apparatuses 107.

As the exhaust gas measuring devices 104 (hereinafter also simply referred to as measuring devices 104), in the present embodiment, for example, one that measures HC, $NO_x$, CO, $CO_2$, and the like in exhaust gas flowing through an exhaust path of the internal combustion engine, and one that performs preprocessing for measuring the exhaust gas components, such as CVS, are prepared. Each of the measuring devices 104 is configured to integrate one or more units as unit devices, such as a gas analyzing unit 109 and another operation unit; however, the units are not always physically integrated. For example, referring to the whole of a plurality of separated configurations, it is called one measuring device, and a plurality of measuring devices may be provided in one housing. In addition, the gas analyzing unit 109 refers to, for example, FID for measuring THC, CLD for measuring $NO_x$, NDIR for measuring CO and $CO_2$, or the like.

The measuring devices 104 are also set as management units in an after-mentioned storage part 176 of the device management apparatus 107 or in a database shared thereby. To describe data structure inside the storage part 176 in detail, the storage part 176 stores hierarchical structure data having tree structure in which as a lower layer of a device hierarchy to which the measuring devices 104 belong to, a group hierarchy to which groups belong to is formed, and further, under the group hierarchy, a unit hierarchy to which analyzing units and the like belong to is formed.

Each of the groups is provided for as, for example, a set of one or more analyzing units 109 that operate for a common purpose. The common purpose refers to, for example, exhaust gas component analysis at a predetermined sampling point in an intake and exhaust path LG, or measurement of predetermined performance (such as an EGR rate or an exhaust gas flow rate) of the internal combustion engine EG.

Note that the present embodiment is configured to be able to perform a change operation on the storage part 176 such as upgrading a group to a measuring device, or changing an analyzing unit belonging to a group, and subject to the condition that each of the groups and devices is physically configured to be able to independently operate by itself (such as being provided with a pump to be able to independently sample gas).

Exemplifications of the plurality of types of measuring devices 104 in the present embodiment include, for example, a first measuring device 1401 provided with: measuring groups G10 to G13 each configured to have a plurality of gas analyzing units 109 respectively having different measurement principles; and an EGR rate measuring device G14, a second measuring device 1402 configured to have a fixed capacity sampling device, a third measuring device 1403 configured to have a measuring group Gn1 including an EGR rate measuring device, and other devices.

Each of the measuring devices 104 has a local computer, and is provided with: a device main body part 14a that controls operating modes (such as a measurement mode, calibration mode, and purge mode) and state modes (such as a sleep mode and a stand-by mode) of the measuring device 104; and a communication part 14b that receives a command signal from the device management apparatus 107 as well as transmitting operating situation information to the device management apparatus 107.

Figure 7:
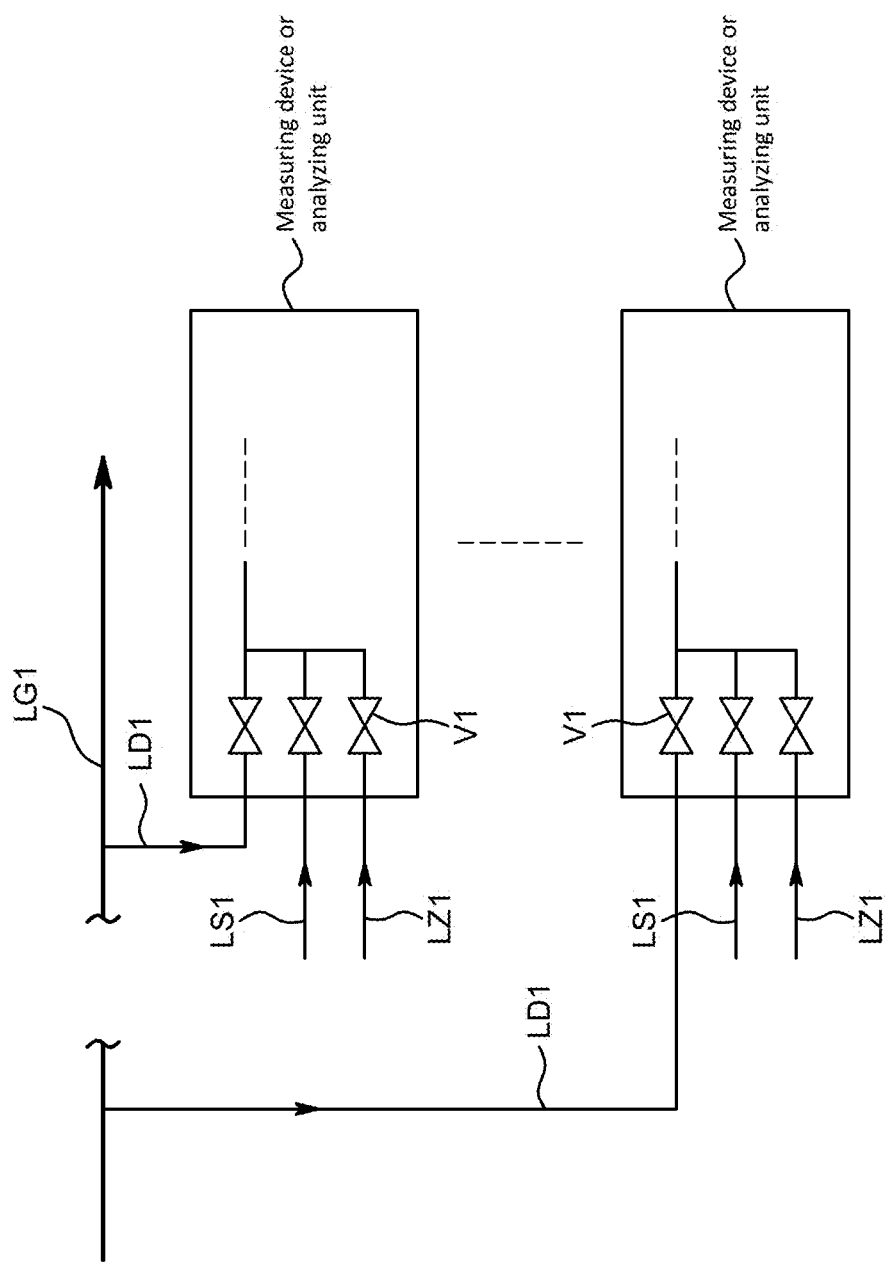
FIG. 7 is a fluid circuit diagram simply illustrating gas flow paths in the second embodiment.

Each of the measuring devices 104 is, as schematically illustrated in FIG. 7, connected to a sampling pipe LD1 for sampling intake gas or exhaust gas from the intake and exhaust path LG1 of the engine. In addition, in FIG. 7, a symbol LS1 represents a span gas introduction pipe for introducing span gas for calibration, a symbol LZ1 represents a zero gas introduction pipe for introducing zero gas for calibration, and a symbol V1 represents a valve for switching.

Each of the measuring devices 104 measures amounts of the respective components associated with the gas sampled through the sampling pipe LD1, such as HC, $NO_x$, CO, and $CO_2$, and from corresponding measured values, can also calculate performance values such as the fuel consumption and an EGR rate of devices constituting the vehicle VH1, such as the engine and a catalyst.

Figure 8:
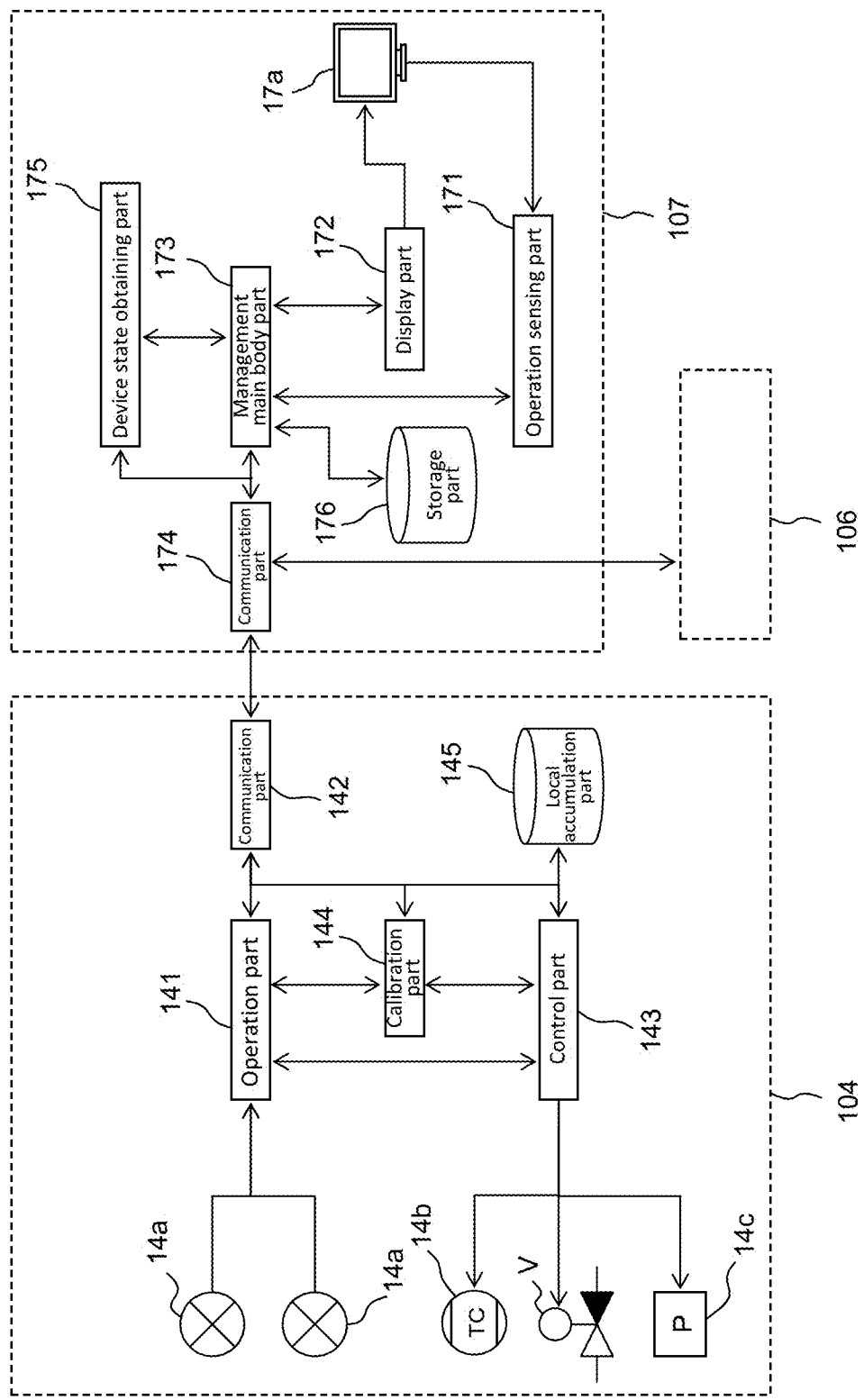
FIG. 8 is a functional block diagram of a measuring device and a device management apparatus in the second embodiment.

For this purpose, as illustrated in FIG. 8, each of the measuring devices 104 has the local computer, in addition to sensors 14a that are provided for each analyzing unit, and for measurement use.

The local computer is one that is physically provided with a CPU, a memory, an A/D converter, a communication interface, and the like, and fulfills function as: an operation part 141 that performs correction or calibration on output values from the sensors 14a to calculate measured values indicating the respective component amounts as well as from the measured valued, calculating the device performance values; and a communication part 142 that transmits the measured values, device performance values, and the like calculated by the operation part 141 to the device management apparatus 107 according to a predetermined protocol.

Also, the local computer is further provided with: a control part 143 that receives a command signal from the device management apparatus 107 to control a valve V, temperature control mechanism 14b, pump 14c, or the like, and controls the operating modes (such as a measurement mode, calibration mode, and purge mode) and the state modes (such as a sleep mode and a stand-by mode) of a corresponding one of the exhaust gas measuring devices 104; a calibration part 144 that calibrates the sensors 14a; a local accumulation part 145 that successively obtains and accumulates pieces of device state information on the measuring device 104 over a range from the past to the present and is provided in a predetermined area of the memory; and the like.

The device state information refers to information indicating a state of the measuring device 104, an analyzing unit of the measuring device 104, a further inner device, or a related device, and includes, for example, pump pressure information indicating suction pressure by the built-in pump 14c, function information that is information on a function (e.g., sensitivity) of each of the sensors 14a, accumulated operating time information indicating an accumulated operating time of each part, inspection data/time specifying information that is information for specifying a preset inspection date/time of the measuring device 104, and the like. The device state information also includes information obtained from results of calibration (zero point correction, span correction, conversion expression correction), quality check (function check of each part of each analyzing unit, pipe leak check, pump performance check, and the like), and the like performed on the measuring device 104.

The device management apparatus 107 is one that is configured by, for example, installing a predetermined program in a general-purpose computer, and physically provided with a CPU, memory, display, input means (such as a keyboard and a mouse), communication interface, and the like. Also, the CPU and its peripheral devices cooperate according to a program stored in the memory, and thereby the device management apparatus 107 fulfills functions as, as illustrated in FIG. 8, an operation sensing part 171, display part 172, management main body part 173, communication part 174, device information obtaining part 175, storage part 176, and the like. The device management apparatus 107 is provided with a communication port, and the measuring devices 104 are mutually communicably connected to the device management apparatus 107 by wire or wireless means.

Next, operation of the device management apparatus 107 is described, which doubles as description of the respective parts of the device management apparatus 107.

First, an operator performs various types of work (such as piping) associated with the measuring devices 104, and then physically connects the measuring devices 104 to the device management apparatus 107 through connector cables.

Figure 9:
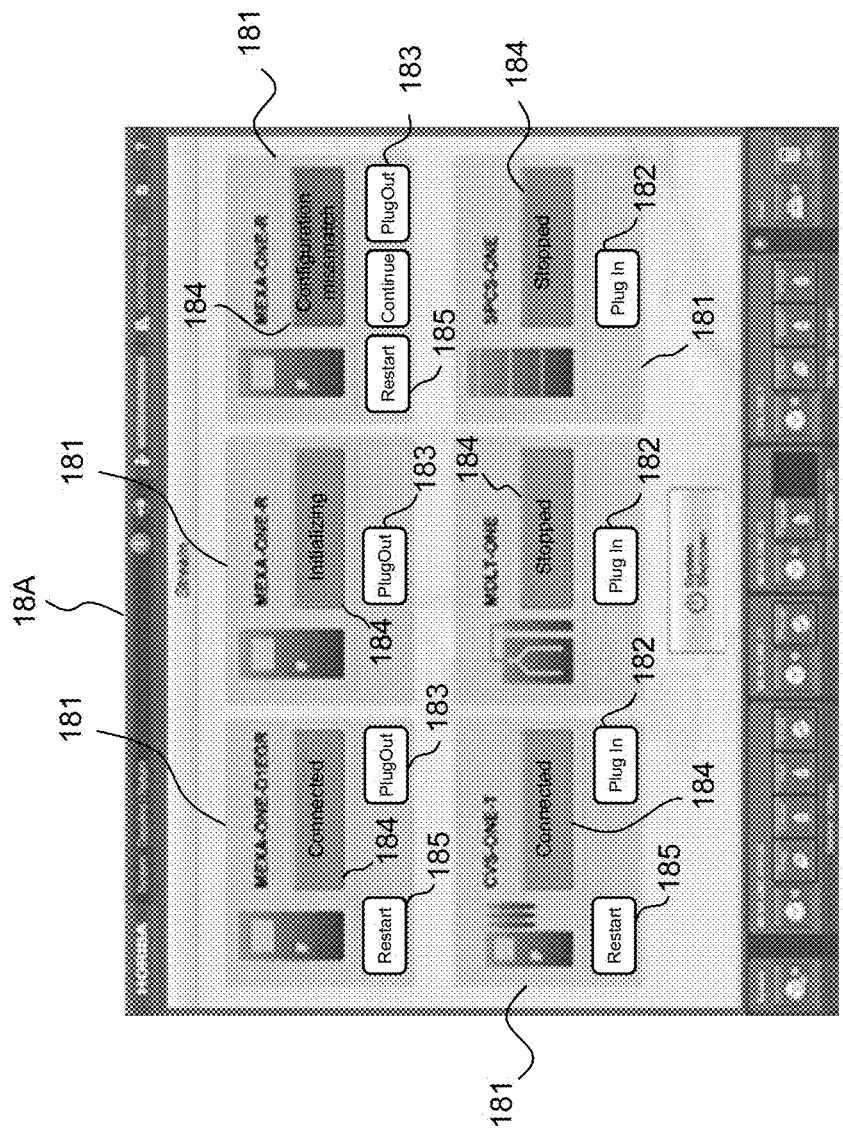
FIG. 9 is a screen configuration diagram illustrating a plug-in screen in the second embodiment.

On the display 17a of the device management apparatus 107, as an initial screen, a screen (hereinafter also referred to as a plug-in screen) 18A as illustrated in FIG. 9 is displayed by a function of the display part 172. On the plug-in screen 18A, a plurality of device marks 181 indicating preliminarily registered measuring devices 104 are arranged without overlapping one another. Each of the device marks 181 is formed in a rectangular shape, and provided with, in addition to a schematic diagram representing a corresponding one of the measuring devices 104, a connecting button 182 for connecting to the measuring device 104, a disconnecting button 183 for disconnecting the measuring device 104; and a connecting state display area 184 indicating a connection state.

When on the plug-in screen 18A, the operator clicks, for example, a connecting button 182, the operation sensing part 171 detects the click operation as a connecting operation. With this as a start, the communication part 174 starts to communicate with a communication part 142 of a corresponding one of the measuring devices 104, and when a predetermined connecting protocol normally terminates to establish a mutually communicable connecting state (hereinafter also simply referred to as a connecting state), a display "Connected" indicating a state of being communicably connected is displayed in the connecting state display area 184 in the device mark. In addition, until the mutual communication is established, a display "Initialization" indicating a state of being in preparation for connection is displayed in the connecting state display area 184.

On the other hand, when the disconnecting button 183 is clicked in this connecting state, the operation sensing part 171 detects the click operation as a disconnecting operation. Then, the communication part 174 blocks the communication with the communication part 142 of the measuring device 104, and a display "Stopped" indicating a state where the connection is cancelled is displayed in the connecting state display area 184.

In addition, if the connecting button 182 is clicked in a state where a connector cable is unplugged, or the connector cable is unplugged during the connecting state, the operation sensing part 171 senses this, and a display "Configuration Mismatch" indicating a state of failing in connection is displayed in the connecting state display area 184.

Also, in the connecting state, a reconnecting button (restart button) 185 is newly displayed, and when the reconnecting button 185 is clicked, the communication part 174 restarts the connecting protocol to make reconnection.

Meanwhile, in the present embodiment, in the connecting protocol, a step of taking pieces of device state information on the respective measuring devices 104 into the device management apparatus 107 is automatically performed.

To describe in detail, when any of the connecting buttons 182 or reconnecting buttons 185 is clicked, the operation sensing part 171 detects the click operation, on the basis of which the device information obtaining part 175 accesses a local accumulation part 145 of a corresponding one of the measuring devices 104 through the communication parts 142 and 174 to automatically obtain pieces of device state information on the measuring device 104 over a range from the past to the present, which are accumulated in the local accumulation part 145.

Also, after the connection, too, the device information obtaining part 175 successively accesses the local accumulation part 145 of the measuring device 104 to additionally obtain device state information.

In addition, the management main body part 173 performs various management operations such as issuing a command for an operation mode or the like to the measuring device 4, and obtaining measured values and function performance values from the measuring device 104.

The pieces of device state information obtained in such a manner are managed in the management main body part 173, and also can be displayed on a screen in chronological order.

Figure 10:
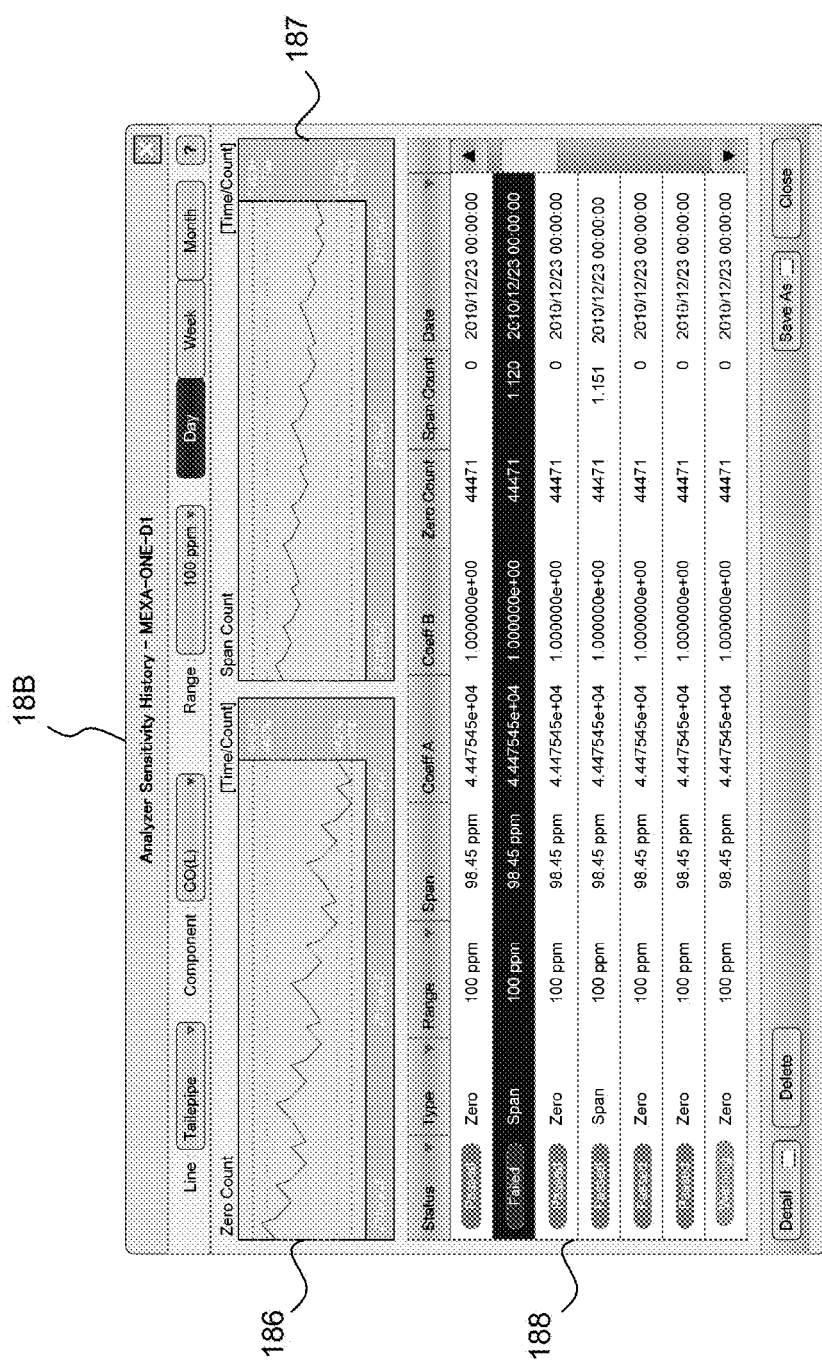
FIG. 10 is a screen configuration diagram illustrating an operating situation of a device state history screen in the second embodiment.

FIG. 10 illustrates an example of the display screen (hereinafter also referred to as a device state history screen). On the screen 18B, time-dependent changes in sensitivity and drift of a gas analyzing unit selected by the operator are displayed as graphs 186 and 187 with horizontal axes representing time, and as a list 188. The sensitivity of the analyzing unit refers to a primary output value of a corresponding sensor 14a at the time of sensing the span gas having a predetermined concentration, and a decrease in this value indicates a reduction in sensor sensitivity. The drift refers to a primary output value of a corresponding sensor 14a at the time of sensing the zero gas (gas having a concentration of zero), and an increase in this value indicates an increase in offset of the sensor 14a. Amounts of the sensitivity and drift are measured at the time of calibrating a corresponding measuring device 104, and therefore every time the measurement is performed, additionally recorded in the local accumulation part 145 of the measuring device 104.

Also, in the case where the device state information exceeds (or falls below) a predetermined threshold value, the management main body part 173 of the device management apparatus 107 notifies of the need for maintenance or replacement. As the threshold value, for the drift or sensitivity amount, a first threshold value for issuing a final alarm, and a second threshold value for notifying of being in a stage prior to the final alarm are provided. As an example of the notification, in the present embodiment, in the case of exceeding the first threshold value, on the same screen 18B, a relevant column of the list is changed so as to be displayed in another display mode such as red. The same holds true for the second threshold value, and in the present embodiment, in order to be able to distinguish from the case of exceeding the first threshold value, a relevant column is changed so as to be displayed in, for example, orange.

According to each of the notification alarms, the operator can readjust a corresponding analyzing unit.

Figure 11:
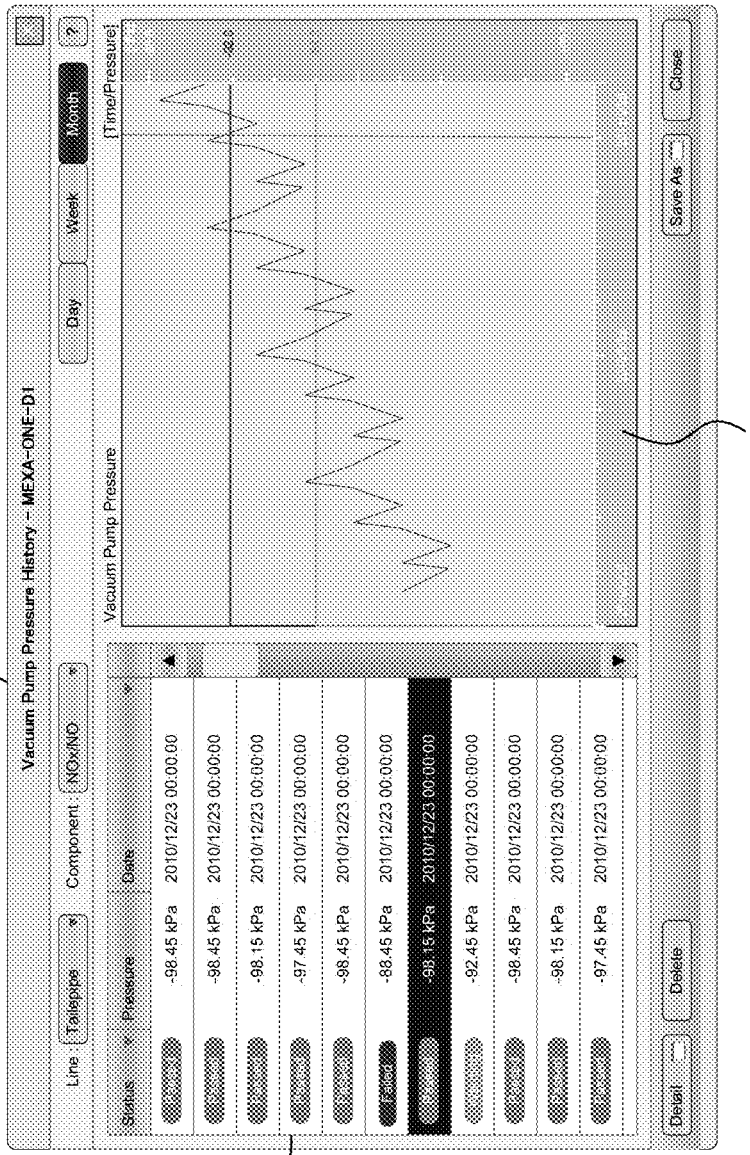
FIG. 11 is a screen configuration diagram illustrating an operating situation of another device state history screen in the second embodiment.

Also, a display example of another device state history screen is illustrated in FIG. 11. On this screen, a chronological change in pressure of a vacuum pump provided in a CLD as an analyzing unit is displayed as a list 189 and a graph 810. On the screen, as notification operation in the case of exceeding the threshold values, in addition to the display as the list as in FIG. 10, the first threshold value and the second threshold value are displayed as line segments in the graph 810.

According to the present embodiment configured as described, any of the measuring devices 104 accumulates pieces of device state information on itself, and at the time of connection, the pieces of device state information are automatically taken in by the device management apparatus 107, so that even in the case of replacing the device management apparatus 107, the pieces of device state information is inherited without leaking, and therefore compliance of regulations, and maintenance of the measuring device 4 can be surely performed.

Accordingly, management such as automatically notifying the operator of a coming inspection date/time, maintenance data/time, inspection and maintenance items, and the like of each connected measuring device 104 can be surely made in the device management apparatus 107.

In particular, in the present embodiment, the connecting states of the plurality of measuring devices 104 can be freely controlled by the disconnecting/connecting operation performed by the operator on the device management apparatus 107 side, and also each connectable measuring device 104 can be preliminarily registered in a plurality of device management apparatuses 107 in common in a standardized format, i.e., as the device mark 181, so that only by physically connecting some measuring device 104 to another device management apparatus 107 in another cell to perform the connecting operation in the same manner, the device management apparatus 107 can be easily made to recognize the measuring device 104.

Also, as described, a measuring device 104 and a device management apparatus 107 can be easily connected without selecting connecting destinations, and therefore the test system can be more flexibly operated.

Further, with the time-dependent change and tendency in device state information being displayed on the screen, notification is made on the same screen when a value of the device state information exceeds any of the threshold values, and therefore as compared with the case of simply issuing an alarm without displaying the change tendency, the operator can more accurately determine a cause of the notification or alarm. For example, in the case of an alarm that is outputted when the value deviates from the tendency, and suddenly rises or falls, the operator can determine that the alarm is caused by a measurement error, a calibration error, or the like, and therefore the number of times of unnecessary maintenance can be reduced.

Note that the present invention is not limited to the above-described embodiment. For example, the present invention can also be applied to a test of the engine as a single body, or used for a test of an airplane or a ship, or any device of the airplane or ship.

The testing devices also include, without limitation to the exhaust gas measuring device, a device used to test a moving body such as a ship or an airplane, or to test a component of the moving body, for example, an automatic driving apparatus such as a dynamometer or a robot. The device management apparatus includes, besides an apparatus directly managing testing devices, an apparatus indirectly managing them, such as the automatic test management apparatus in the above-described embodiment.

REFERENCE SIGNS LIST

1: Vehicle performance test system
4: Measuring device
7: Device management apparatus
71: Disconnecting/connecting operation sensing part
72: Display part
73: Management main body part
81: Device mark
82: Disconnecting/connecting operation button (connecting button)
83: Disconnecting/connecting operation button (disconnecting button)
VH: Moving body (vehicle)
100: Vehicle performance test system
104: Measuring device
107: Device management apparatus
171: Operation sensing part
172: Display part
173: Management main body part
181: Device mark
182: Disconnecting/connecting operation button (connecting button)
183: Disconnecting/connecting operation button (disconnecting button)
VH1: Moving body (vehicle)

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A test system that is, with a moving body such as a vehicle, a ship, or an airplane, or a device used for the moving body being set as an object, intended to perform a test of the object, the test system comprising:
one or more testing devices used for the test; and a device management apparatus that is communicably connected to the testing devices to manage the testing devices, wherein
the device management apparatus comprises:
a disconnecting/connecting operation sensing part that senses that a disconnecting/connecting operation for connecting or disconnecting any of the testing devices has been performed; and
a management main body part that, in a case where the disconnecting/connecting operation sensing part detects a connecting operation, starts a predetermined connecting protocol for establishing a connecting state and starts management of the testing device, as well as in a case where the disconnecting/connecting operation sensing part detects a disconnecting operation, canceling the connection to terminate the management of the testing device.

2. The test system according to claim 1, wherein:
the device management apparatus further comprises a display part that displays a device mark indicating a preliminarily registered testing device, and a disconnecting/connecting operation button provided so as to correspond to the device mark; and
the disconnecting/connecting operation sensing part detects an operation on the disconnecting/connecting operation button.

3. The test system according to claim 1, wherein
the testing devices are measuring devices used to measure exhaust gas of an internal combustion engine.

4. A device management apparatus that is communicably connected to one or more testing devices for testing a moving body such as a vehicle, a ship, or an airplane, or a device used for the moving body, the device management apparatus comprising:
a disconnecting/connecting operation sensing part that senses that a disconnecting/connecting operation for connecting or disconnecting any of the testing devices has been performed; and
a management main body part that, in a case where the disconnecting/connecting operation sensing part detects a connecting operation, starts a predetermined connecting protocol for establishing a connecting state and starts management of the testing device, as well as in a case where the disconnecting/connecting operation sensing part detects a disconnecting operation, canceling the connection to terminate the management of the testing device.

5. A test system that is, with a moving body such as a vehicle, a ship, or an airplane, or a device used for the moving body being set as an object, intended to perform a test of the object, the test system comprising:
one or more testing devices used for the test; and a device management apparatus that is communicably connected to the testing devices to manage the testing devices, wherein
the device management apparatus comprises:
an operation sensing part that senses that a disconnecting/connecting operation for connecting or disconnecting any of the testing devices has been performed; and
a device state information obtaining part that, with detection of a connecting operation as a start, obtains device state information indicating a present or past state of a corresponding testing device, the detection being performed by the operation sensing part.

6. The test system according to claim 5, wherein
the device state information is accumulated in a local accumulation part provided in the testing device, and the device state information obtaining part accesses the local accumulation part to obtain the device state information on the testing device.

7. The test system according to claim 5, further comprising
a management main body part that recognizably displays a chronological change in value of the device state information on a screen, as well as in a case where the value of the device state information exceeds a predetermined threshold value, notifying of this.

8. The test system according to claim 7, wherein
the testing devices are devices that are provided in an exhaust path of an internal combustion engine and measure exhaust gas flowing through the exhaust path.

9. The test system according to claim 5, wherein
the device state information is, in a case where the testing device is a pump, pump pressure information that is information indicating suction pressure by the pump, or in a case where the testing device is a measuring device, function information that is information on a function of the measuring device, accumulated operating time information indicating an accumulated operating time of the testing device, or inspection date/time specifying information that is information for specifying a preset inspection date/time of the testing device.

10. A device management apparatus that is communicably connected to one or more testing devices for testing a moving body such as a vehicle, a ship, or an airplane, or a device used for the moving body, the device management apparatus comprising:
   an operation sensing part that senses that a disconnecting/connecting operation for connecting or disconnecting any of the testing devices has been performed; and
   a device state information obtaining part that, with detection of a connecting operation in the operation sensing part as a start, obtains device state information indicating a present or past state of a corresponding testing device.

\* \* \* \* \*